United States Patent [19]
Piltingsrud

[11] Patent Number: 5,440,839
[45] Date of Patent: Aug. 15, 1995

[54] WINDOW OPERATOR

[75] Inventor: Stephen M. Piltingsrud, Owatonna, Minn.

[73] Assignee: Truth Hardware Corporation, Owatoona, Minn.

[21] Appl. No.: 95,054

[22] Filed: Jul. 20, 1993

[51] Int. Cl.6 .............................................. E05F 11/24
[52] U.S. Cl. ..................... 49/342; 464/151; 403/57
[58] Field of Search .................. 49/339, 341, 342; 464/147, 151; 403/57, 122, 142

[56] References Cited

U.S. PATENT DOCUMENTS

| | | | |
|---|---|---|---|
| 1,095,682 | 5/1914 | Smyser | 49/341 |
| 1,579,630 | 4/1926 | Bertsche | 464/151 |
| 2,641,115 | 6/1953 | Garrison | 464/151 |
| 2,817,511 | 12/1957 | Reynaud | 49/341 X |
| 2,954,685 | 10/1960 | Cuq | 464/151 |
| 3,250,038 | 5/1966 | Steel | 49/341 |
| 4,136,578 | 1/1979 | Van Klompenburg . | |
| 4,241,541 | 12/1980 | Van Klompenburg et al. . | |
| 4,253,276 | 3/1981 | Peterson et al. . | |
| 4,266,371 | 5/1981 | Erdman et al. . | |
| 4,305,228 | 12/1981 | Nelson . | |
| 4,346,372 | 8/1982 | Sandberg . | |
| 4,497,135 | 2/1985 | Vetter . | |
| 4,521,993 | 6/1985 | Tacheny et al. . | |
| 4,617,758 | 10/1986 | Vetter . | |
| 4,672,786 | 6/1987 | Peppers | 403/57 X |
| 4,823,508 | 4/1989 | Allen . | |
| 4,840,075 | 6/1989 | Tucker . | |
| 4,843,703 | 7/1989 | Nolte et al. . | |
| 4,845,830 | 7/1989 | Nolte et al. . | |
| 4,894,902 | 1/1990 | Tucker . | |
| 4,937,976 | 7/1990 | Tucker et al. . | |
| 4,938,086 | 7/1990 | Nolte et al. . | |
| 4,945,678 | 8/1990 | Berner et al. . | |
| 5,054,239 | 10/1991 | Tucker et al. . | |
| 5,152,103 | 10/1992 | Tucker et al. . | |
| 5,199,216 | 4/1993 | Vetter et al. . | |

Primary Examiner—Peter M. Cuomo
Assistant Examiner—Jerry Redman
Attorney, Agent, or Firm—Wood, Phillips, VanSanten, Clark & Mortimer

[57] ABSTRACT

An operator for controlling movement of a window sash relative to a window frame, including a drive gear pivotable about a central axis substantially perpendicular to one side of the window frame and drivably linked to move the sash, a connector defining first and second pivot axes intersecting at a point and rotatable around the intersection point, a worm pivotable about an axis substantially perpendicular to the central axis and drivably engaging a portion of the drive gear by a helical thread having variable height peaks lying in an annular orientation substantially conforming to the annular orientation of the drive gear portion, and a drive input shaft rotatable about a shaft axis intersecting the worm axis at an angle. The worm, connector and drive shaft are secured whereby the connector is pivotable relative to the worm about the first pivot axis and the connector is pivotable relative to the drive shaft about the second pivot axis. The worm includes a forked end received in an annular slot defined about the connector and the shaft includes a forked end received in a second annular slot defined about the connector, with both of the slots being centered on the intersection point and intersecting one another at substantially right angles.

20 Claims, 1 Drawing Sheet

WINDOW OPERATOR

BACKGROUND OF THE INVENTION

1. Technical Field

The present invention is directed toward window operators, and more particularly toward window operators adapted to opening and closing of a window sash relative to a window frame.

2. Background Art

There are, of course, any number of different types of window (and other closure) operators which are well known in the art. Examples of such operators are shown, for example, in Van Klompenburg U.S. Pat. No. 4,136,578, Van Klompenburg et al. U.S. Pat. No. 4,241,541, Peterson et al. U.S. Pat. No. 4,253,276, Erdman et al. U.S. Pat. No. 4,266,371, Nelson U.S. Pat. No. 4,305,228, Sandberg U.S. Pat. No. 4,346,372, Vetter U.S. Pat. No. 4,497,135, Tacheny et al. U.S. Pat. No. 4,521,993, Vetter U.S. Pat. No. 4,617,758, Allen U.S. Pat. No. 4,823,508, Tucker U.S. Pat. No. 4,840,075, Nolte et al. U.S. Pat. No. 4,843,703, Nolte et al. U.S. Pat. No. 4,845,830, Tucker U.S. Pat. No. 4,894,902, Tucker et al. U.S. Pat. No. 4,937,976, Nolte et al. U.S. Pat. No. 4,938,086, Berner et al. U.S. Pat. No. 4,945,678, Tucker et al. U.S. Pat. No. 5,054,239, Tucker et al. U.S. Pat. No. 5,152,103, and Vetter et al. U.S. Pat. No. 5,199,216.

Generally speaking, such operators have used a variety of linkages in combination with suitable hinge structures, where the operator linkages are actuated by rotation of a manual or powered drive connected to the linkage through assorted worm gear drives.

It is a basic requirement of all such operators that they be able to withstand the extremely high loads often encountered such as, for example, when breaking the weatherstrip seal during initial opening of the sash and when closing the window sash to seal about the entire periphery of the weather strip. Further, operational and aesthetic requirements relating to the orientation of different parts of the drive train of the operator have necessitated the use of high strength, and relatively costly, materials (such as suitably hardened metals). Such materials are inherently susceptible to corrosive environments such as are commonly found in many areas, particularly in seaside dwellings. In order to provide a long useful life for the operator, various attempts have been made to coat or treat the metal components to resist corrosion. However, even the most successful of such treatments can significantly increase the cost of manufacturing the operator.

The present invention is directed toward overcoming one or more of the problems set forth above.

SUMMARY OF THE INVENTION

In one aspect of the present invention, an operator for controlling movement of a window sash relative to a window frame is provided, including a drive gear pivotable about a central axis substantially perpendicular to one side of the window frame and drivably linked to move the sash, a connector defining first and second pivot axes intersecting at a point and rotatable around the intersection point, a worm pivotable about an axis substantially perpendicular to the central axis and drivably engaging a portion of the drive gear by a helical thread having variable height peaks lying in an annular orientation substantially conforming to the annular orientation of the drive gear portion, and a drive input shaft rotatable about a shaft axis intersecting the worm axis at an angle. The worm, connector and drive shaft are secured whereby the connector is pivotable relative to the worm about the first pivot axis and the connector is pivotable relative to the drive shaft about the second pivot axis.

In another aspect of the present invention, the worm includes a forked end received in an annular slot defined about the connector, the shaft includes a forked end received in a second annular slot defined about the connector, with both of the slots being centered on the intersection point and intersecting one another at substantially right angles.

It is an object of the invention to provide a window operator which may be simply and inexpensively manufactured and installed.

It is another object of the invention to provide a window operator which may be simply and reliably operated over a long useful life.

It is a further object of the present invention to provide an operator which is highly resistant to corrosion in the different types of environments commonly encountered by dwellings.

It is still another object of the present invention to provide a window operator which may be retrofit into existing window operator locations.

It is yet another object of the present invention to provide a window operator which may be reliably operated by a powered input such as an electric motor or by manual turning of a handle as desired for a particular installation.

DESCRIPTION OF THE PREFERRED EMBODIMENT

Figure 1:
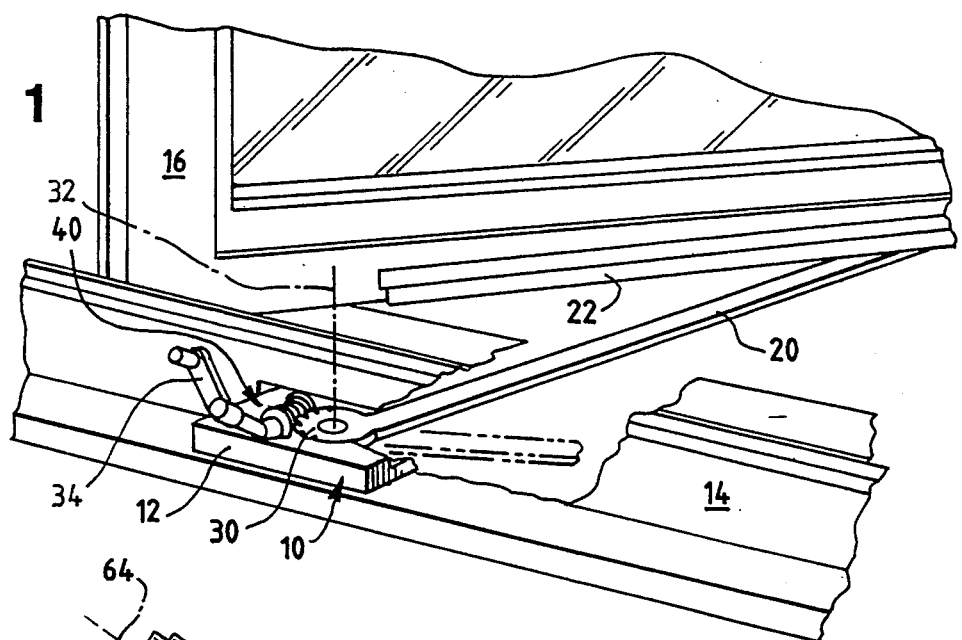
FIG. 1 is a perspective broken view of a window with an operator including the drive of the present invention.

A first embodiment of the window operator 10 of the present invention is shown in FIG. 1.

The window operator 10 includes a base 12 suitably mounted to a window frame 14 to which a suitable window sash 16 is secured.

With the particular embodiment shown, the operator 10 includes a single arm 20 having a roller (not shown) on its end, which roller is received in a track 22 secured to the sash 16. A suitable hinge (not shown) is mounted between the window frame 14 and the window sash 16 to define the relative movement between the frame 14 and sash 16. Re single arm operator shown in the Figures moves the sash 16 by pivoting the arm 20 to exert a force on the sash 16 through the connection of the roller and the track 22. Such basic operation is known in the art.

As will become apparent from this disclosure, the connection between the gear drive of the operator and the window sash may, however, be of virtually any type wherein operation involves pivoting of a link relative to the window frame, with the pivoted link acting to move the sash in some path. Thus, once an understanding of the present invention is obtained, it will be recognized that the present invention may be readily incorporated in window operators using still other link connections between a pivoting drive and the window sash, including the various different link configurations used in operators shown in Van Klompenburg et al. U.S. Pat. No. 4,241,541, Peterson et al. U.S. Pat. No. 4,253,276, Erdman et al. U.S. Pat. No. 4,266,371, Nelson U.S. Pat. No. 4,305,228, Sandberg U.S. Pat. No. 4,346,372, Vetter U.S. Pat. No. 4,497,135, Tacheny et al. U.S. Pat. No. 4,521,993, Vetter U.S. Pat. No. 4,617,758, Allen U.S. Pat. No. 4,823,508, Tucker U.S. Pat. No. 4,840,075, Nolte et al. U.S. Pat. No. 4,843,703, Nolte et al. U.S. Pat. No. 4,845,830, Tucker U.S. Pat. No. 4,894,902, Tucker et al. U.S. Pat. No. 4,937,976, Nolte et al. U.S. Pat. No. 4,938,086, Berner et al. U.S. Pat. No. 4,945,678, Tucker et al. U.S. Pat. No. 5,054,239, Tucker et al. U.S. Pat. No. 5,152,103, and Vetter et al. U.S. Pat. No. 5,199,216, the disclosures of which relating to the connection of a pivoting drive to a window sash are all hereby incorporated by reference.

The operator arm 20 is suitably secured for pivoting with a gear 30 about a substantially perpendicular central axis 32 of the operator 10. This thus allows the arm 20 to be pivoted in a plane which is substantially parallel to the plane of motion of the side of the sash 16 to which the arm 20 is connected. Thus, in the disclosed installation, the axis 32 is vertical and the arm pivots in a horizontal plane.

Conventionally, the axis of the drive input of such operators 10 is at an angle $\beta$ from the horizontal plane, where $\beta$ is on the order of 35 degrees. Such an angle permits the drive handle 34 (see FIG. 1) of manually driven operators to be easily operated with minimal intrusion into the room. That is, if the axis of the drive input were vertical, the person rotating the handle would likely bang their knuckles against the sash. Alternatively, if the axis were horizontal, the handle would project into the room from the frame and thus could be damaged when bumped, or could damage something which bumped into it, and could further be ergonomically difficult to rotate at typically low window heights.

Figure 2:
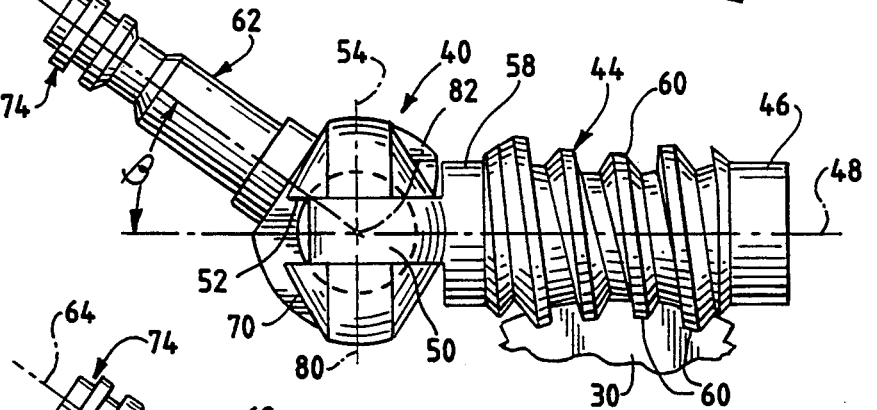
FIG. 2 is a side view of a portion of the drive of the present invention.
Figure 3:
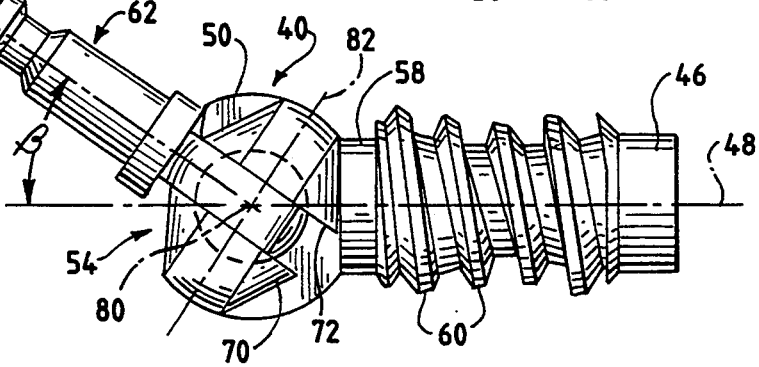
FIG. 3 is a view similar to FIG. 2, but showing the drive after one quarter turn.
Figure 4:
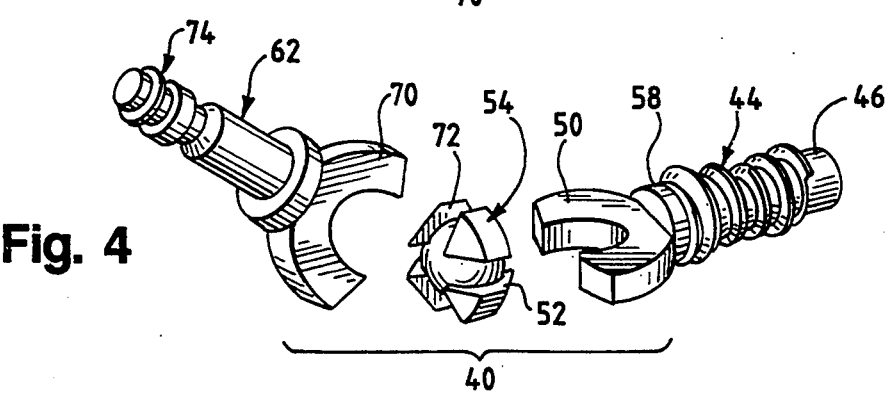
FIG. 4 is a perspective exploded view of the drive portion shown in FIGS. 2 and 3.

This orientation of the drive input of the operator 10 of the present invention is provided by the ball joint drive 40 shown in FIGS. 2–4.

Specifically, the drive input includes an enveloping worm 44 suitably secured to the base 12 at one end 46 for pivoting about a substantially horizontal axis 48. The other end of the worm 44 is forked 50 and received in an annular slot 52 of a connecting ball 54. The worm 44 is also preferably also secured to the base 12 at a cylindrical section 58 adjacent to the forked end 50 for pivoting about the horizontal axis 48.

The worm 44 includes a helical thread 60 having a variable height whereby the peaks of the thread 60 lie in an annular orientation substantially conforming to the annular configuration of the engaged gear 30, whereby the engaging surfaces between the worm 44 and the gear 30 may be maximized and the stress along those surfaces minimized. As a result of these minimized stresses, the worm 44 and gear 30 may be made of low cost and corrosion resistant plastic while still being able to withstand the high loads often encountered by window operators.

A drive input shaft 62 is also suitably mounted to the base 12 for rotation about an axis 64 which intersects the horizontal axis 48 at an angle $\beta$ (with the point of intersection of the axes 48, 64 being at the center of the ball 54) to preferably define a vertical plane. The input shaft 62 includes a forked end 70 received in a second annular slot 72 in the connecting ball 54. The opposite end 74 of the input shaft 62 is adapted for connection to a handle or a motor drive such as is known in the art.

The two slots 52, 72 are centered about radii 80, 82 of the ball 54 which are preferably oriented at right angles relative to one another. Therefore, the ball 54 and worm 44 pivot relative to one another about one of the radii 80 and the ball 54 and the input shaft 62 pivoting relative to one another about the other of the radii 82.

The operation of the ball joint drive 40 is best shown by an examination of FIGS. 2 and 3. In the FIG. 2 position, the forked end 50 of the worm 44 is horizontally oriented such that its pivot radius 80 is vertically oriented, and the forked end 70 of the input shaft 62 is vertically oriented such that its pivot radius 82 is horizontal.

When the input shaft 62 is pivoted 90 degrees to control the operator 10, the drive 40 is disposed in the FIG. 3 position, with the pivot radius 80 of the worm forked end 50 horizontally oriented, and the pivot radius 82 of the input shaft forked end 70 oriented at an angle of $\beta$ relative to vertical.

Continuous rotation of the worm 44 and input shaft 62 is thus permitted about a full 360 degree range, with the motion of the connecting ball 54 being somewhat complex but best defined by two factors: the worm forked end pivot radius 80 pivots in a vertical plane and the input shaft forked end pivot radius 82 pivots in a plane which is oriented at an angle of $\beta$ relative to the vertical plane.

The operator 10 of the present invention has numerous advantages over prior art window operators.

Because the worm 44 has an axis which is in substantially the same plane as the plane of rotation of the gear 30, the worm 44 may envelop the gear 30 as described above so as to maximize the number of engaged teeth between gears at all configurations of the drive. As a result, the gears themselves may be made of low cost plastic while still maintaining the ability of the operator 10 to withstand high loads when creating or breaking the weatherstrip seal. Such plastic gearing permits cost savings over the precision metal components typically now required in operator drives. Further, since such plastic materials are inherently resistant to corrosive environments such as found at seashores and elsewhere, operators made according to the present invention will be highly durable and therefore provide reliable service over the many years of expected useful life without requiring any expensive or marginally effective corrosion resistance treatments.

Of course, the operator 10 as described above can be readily used with motor drives such as are also well known in the art for retrofit use with manual operators having the drive input oriented at an angle of $\beta$ as described.

Still other aspects, objects, and advantages of the present invention can be obtained from a study of the specification, the drawings, and the appended claims.

I claim:

1. An operator for controlling movement of a window sash relative to a window frame, comprising:
    a drive gear having an annular configuration and pivotable about a central axis substantially perpendicular to one side of the window frame;
    a linkage secured to the drive gear and pivotally connectable to the sash whereby pivoting of said drive gear moves the linkage to move the sash relative to the frame;

a connector defining first and second pivot axes intersecting at a point, said connector being rotatable about said intersection point;

a worm pivotable about a worm axis through said intersection point and lying in a plane which is substantially perpendicular to the central axis, said worm including a helical thread drivably engaging a portion of the drive gear and having a variable height whereby the peaks of said thread lie in an annular orientation substantially conforming to the annular configuration of the portion of the drive gear;

an input drive shaft rotatable about a shaft axis through said intersection point and pivotable relative to said connector about said second pivot axis, said shaft axis intersecting said worm axis at an angle;

means for securing said worm to said connector for pivoting about the first pivot axis; and means for securing said input drive shaft to said connector for pivoting about the second pivot axis.

2. The operator of claim 1, wherein said first and second pivot axes are substantially perpendicular.

3. The operator of claim 1, further comprising a manually rotatable handle operatively connected to the drive shaft.

4. The operator of claim 1, wherein said drive gear and said worm are inherently corrosion resistant.

5. The operator of claim 4, wherein said drive gear and said worm are non-metallic.

6. The operator of claim 1, wherein said worm securing means comprises a forked end on the worm received in a first annular slot defined about the connector, said slot being centered on said intersection point.

7. The operator of claim 6, wherein said shaft securing means comprises a forked end on the shaft received in a second annular slot defined about the connector, said second slot being centered on said intersection point.

8. The operator of claim 7, wherein said first and second slots intersect one another at substantially right angles.

9. An operator for controlling movement of a window sash relative to a window frame, comprising:
a drive gear having an annular configuration and pivotable about a central axis substantially perpendicular to one side of the window frame;
a linkage secured to the drive gear and pivotally connectable to the sash whereby pivoting of said drive gear moves the linkage to move the sash relative to the frame;
a worm having a forked end and pivotable about a worm axis which lies in a plane which is substantially perpendicular to the central axis, said worm including a helical thread drivably engaging a portion of the drive gear and having a variable height whereby the peaks of said thread lie in an annular orientation substantially conforming to the annular configuration of the portion of the drive gear;
an input drive shaft having a forked end and pivotable about a drive shaft axis which intersects said worm axis at an angle; and
a ball connector having first and second annular slots therein, said slots lying substantially in first and second planes which intersect along a radius of said ball at substantially right angles to one another, the worm forked end being disposed in one of said slots and the drive shaft forked end being disposed in the other of said slots.

10. The operator of claim 9, further comprising a manually rotatable handle operatively connected to the drive shaft.

11. The operator of claim 9, wherein said drive gear and said worm are inherently corrosion resistant.

12. The operator of claim 11, wherein said drive gear and said worm are non-metallic.

13. An operator for controlling movement of a window sash relative to a window frame, comprising:
a base member securable to the window frame and defining a substantially vertical drive axis;
a drive gear having teeth defined by lands and grooves in an annular configuration, said drive gear being mounted to the base member for pivoting about the drive axis and connectable to the sash whereby drive gear pivoting moves the sash relative to the frame;
a worm mounted to the base member for pivoting about a substantially horizontal worm axis, said worm including a forked end and a variable height helical thread drivably engaging said drive gear with annularly oriented peaks substantially conforming to the annular configuration of the grooves of the drive gear teeth;
a drive shaft mounted to said base member for rotation about an upwardly sloped longitudinal axis, the lower end of said drive shaft being forked and the upper end of said drive shaft including means for connecting to a drive input; and
a connector having first and second annular slots defined therein around intersecting first and second pivot axes, respectively, the worm forked end being secured in one of said slots and the drive shaft forked end being secured in the other of said slots.

14. The operator of claim 13, wherein said first and second pivot axes intersect at substantially right angles at a center of the connector, said connector being movable about the point of intersection of the pivot axes during pivoting of said drive gear to pivot the worm.

15. The operator of claim 13, further comprising a manually rotatable handle operatively connected to the drive shaft.

16. The operator of claim 13, wherein said drive gear and said worm are inherently corrosion resistant.

17. The operator of claim 16, wherein said drive gear and said worm are non-metallic.

18. An operator for controlling movement of a window sash relative to a window frame, comprising:
a drive gear having an annular configuration and pivotable about a central axis substantially perpendicular to one side of the window frame;
a linkage secured to the drive gear and pivotally connectable to the sash whereby pivoting of said drive gear moves the linkage to move the sash relative to the frame;
a connector defining first and second pivot axes intersecting at a point, said connector being rotatable about said intersection point;
a worm pivotable about a worm axis through said intersection point and lying in a plane which is substantially perpendicular to the central axis, said worm drivably engaging a portion of the drive gear through a helical thread having a variable height substantially conforming to the drive gear annular configuration;

an input drive shaft rotatable about a shaft axis through said intersection point and pivotable relative to said connector about said second pivot axis, said shaft axis intersecting said worm axis at an angle less than 90 degrees;

means for securing said worm for pivoting relative to said connector about the first pivot axis; and means for securing said input drive shaft for pivoting relative to said connector about the second pivot axis.

19. The operator of claim 18, wherein said shaft axis intersects said worm axis at an angle of between 25 degrees and 45 degrees.

20. The operator of claim 19, wherein said shaft axis intersects said worm axis at an angle of substantially 35 degrees.

* * * * *